(12) United States Patent
Newsam

(10) Patent No.: US 10,072,880 B2
(45) Date of Patent: Sep. 11, 2018

(54) SELF-CONTAINED PLANT CLONING SYSTEM AND METHOD

(71) Applicant: Herbert Newsam, Willamina, OR (US)

(72) Inventor: Herbert Newsam, Willamina, OR (US)

( * ) Notice: Subject to any disclaimer, the term of this patent is extended or adjusted under 35 U.S.C. 154(b) by 254 days.

(21) Appl. No.: 15/263,752

(22) Filed: Sep. 13, 2016

(65) Prior Publication Data

US 2017/0071143 A1    Mar. 16, 2017

Related U.S. Application Data

(60) Provisional application No. 62/218,164, filed on Sep. 14, 2015.

(51) Int. Cl.
| | | |
|---|---|---|
| *A01G 9/24* | (2006.01) | |
| *F25B 21/02* | (2006.01) | |
| *A01G 9/20* | (2006.01) | |
| *A01G 31/02* | (2006.01) | |

(52) U.S. Cl.
CPC ............... *F25B 21/02* (2013.01); *A01G 9/20* (2013.01); *A01G 9/246* (2013.01); *A01G 31/02* (2013.01); *F25B 2321/0251* (2013.01); *Y02P 60/216* (2015.11)

(58) Field of Classification Search
CPC . A01G 9/24; A01G 9/247; A01G 9/14; A01G 9/246
See application file for complete search history.

(56) References Cited

U.S. PATENT DOCUMENTS

| | | | |
|---|---|---|---|
| 3,458,951 A | 8/1969 | Martin | |
| 3,660,933 A | 5/1972 | Wong, Jr. | |
| 3,991,514 A | 11/1976 | Finck | |
| 6,725,598 B2 | 4/2004 | Yoneda et al. | |
| 8,627,598 B1 | 1/2014 | Souder et al. | |
| 2016/0278313 A1* | 9/2016 | Kao | A01G 9/246 |
| 2017/0105368 A1* | 4/2017 | Mehrman | A01G 25/023 |
| 2017/0258021 A1* | 9/2017 | Chiu et al. | A01G 31/02 |
| 2018/0064044 A1* | 3/2018 | Billings | A01G 31/02 |

FOREIGN PATENT DOCUMENTS

| | | | | |
|---|---|---|---|---|
| DE | 3934345 C1 * | 1/1991 | | A01G 9/00 |
| WO | WO-8501647 A1 * | 4/1985 | | A01G 9/246 |

* cited by examiner

*Primary Examiner* — Kristen C Hayes
(74) *Attorney, Agent, or Firm* — Global Intellectual Property Agency, LLC; Jordan Sworen

(57) ABSTRACT

A self-contained plant cloning system and method for stimulating root growth from a stem of a plant. The system includes a reservoir having a base, one or more sidewalls, and an open upper end, defining an interior volume that can hold liquid. A rack rests on the upper end of the reservoir and can support a plant therein. A pump and cooling element are disposed in the reservoir and can be submerged in the liquid. The submersible pump is connected to one or more sprayers that mist liquid on the stems in order to stimulate root growth. As the pump is operated, it circulates the liquid in the reservoir. Liquid directly contacts the cooling element as it circulates in order to efficiently regulate the temperature of the environment in the reservoir.

13 Claims, 4 Drawing Sheets

SELF-CONTAINED PLANT CLONING SYSTEM AND METHOD

CROSS REFERENCE TO RELATED APPLICATION

This application claims the benefit of U.S. Provisional Application No. 62/218,164 filed on Sep. 14, 2015. The above identified patent application is herein incorporated by reference in its entirety to provide continuity of disclosure.

BACKGROUND OF THE INVENTION

The present invention relates to cloning and growing plants. More specifically, the present invention provides a self-contained plant cloning system and method comprising a pump and cooling element disposed within a reservoir, wherein the pump and cooling element are configured to be submerged in liquid such that the pump circulates the liquid through the cooling element in order to efficiently regulate the environment within the reservoir.

In order to clone a plant, the stem separated from the plant to be cloned must be kept in a cool environment in order to stimulate root growth. If the temperature or humidity of the environment is too high, heat can be built up and destroy the stem. Further, heat build-up promotes bacteria to break down living tissue within plants, preventing root growth. In order to stimulate root growth, temperatures within a plant cloning device should be between 75-80 degrees Fahrenheit. However, in order to do so without any type of cooling element, the room temperature in which the cloning device is positioned would be too low for comfortable living, such as a temperature range of 50-55 degrees Fahrenheit in order to maintain an internal temperature of 75-80 degree within the cloning device.

Existing plant cloning and growing devices s a submersible pump in order to disperse liquid onto a stem. However, in order to attempt to regulate the temperature of the environment, these devices use fans to cool the air or the exterior of the device, and not the liquid itself. Other devices that are not self-contained require the continuous addition of ice in order to cool the liquid. Adding ice requires the top of the device to be removed, exposing the interior of the device to external temperatures which interferes with the environment of the plants. Cooling the air is less efficient and leads to unstable temperatures within the environment in which the plants are being cloned.

In light of the devices disclosed in the known art, it is submitted that the present invention substantially diverges in design elements from the prior art and consequently it is clear that there is a need in the art for an improvement to existing self-contained plant cloning systems. In his regard the instant invention substantially fulfills these needs.

SUMMARY OF THE INVENTION

In view of the foregoing disadvantages inherent in the known types of self-contained plant cloning systems now present in the prior art, the present invention provides a new self-contained plant cloning system wherein the same can be utilized for providing convenience for the user when regulating the temperature of the environment thereof in order to stimulate root growth.

It is therefore an object of the present invention to provide a new and improved self-contained plant cloning system that has all of the advantages of the prior art and none of the disadvantages. The system comprises a reservoir having a base, one or more sidewalk, and an open upper end, defining an interior volume adapted to hold liquid. A rack rests on the upper end of the reservoir and is configured to support a plurality of plant stems therein. A pump and cooling element are disposed in the reservoir and are configured to be submerged in the liquid. The submersible pump is connected to one or more sprayers that mist liquid on the stems in order to stimulate root growth. As the pump is operated, it circulates the liquid in the reservoir. The liquid directly contacts the cooling element as it circulates in order to efficiently regulate the temperature of the environment in the reservoir.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
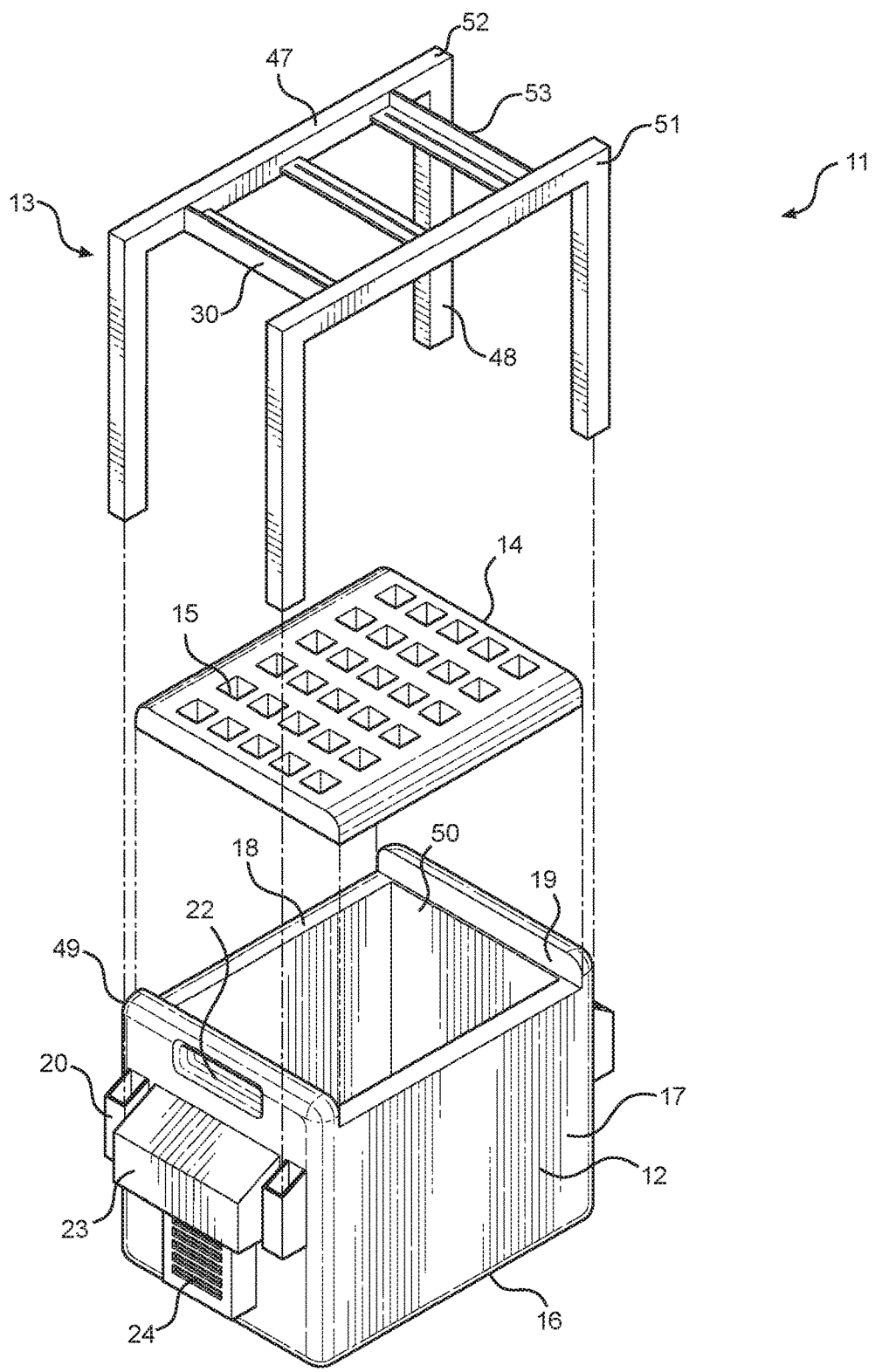
FIG. 1 shows an exploded view of the reservoir, the rack, and the bracket of the self-contained plant cloning system.

Reference is made herein to the attached drawings. Like reference numerals are used throughout the drawings to depict like or similar elements of the self-contained plant cloning system. For the purposes of presenting a brief and clear description of the present invention, the preferred embodiment will be discussed as used for regulating the temperature of the environment within the self-contained plant cloning system for stimulating root growth of a plant stem. The figures are intended for representative purposes only and should not be considered to be limiting in any respect.

Figure 2:
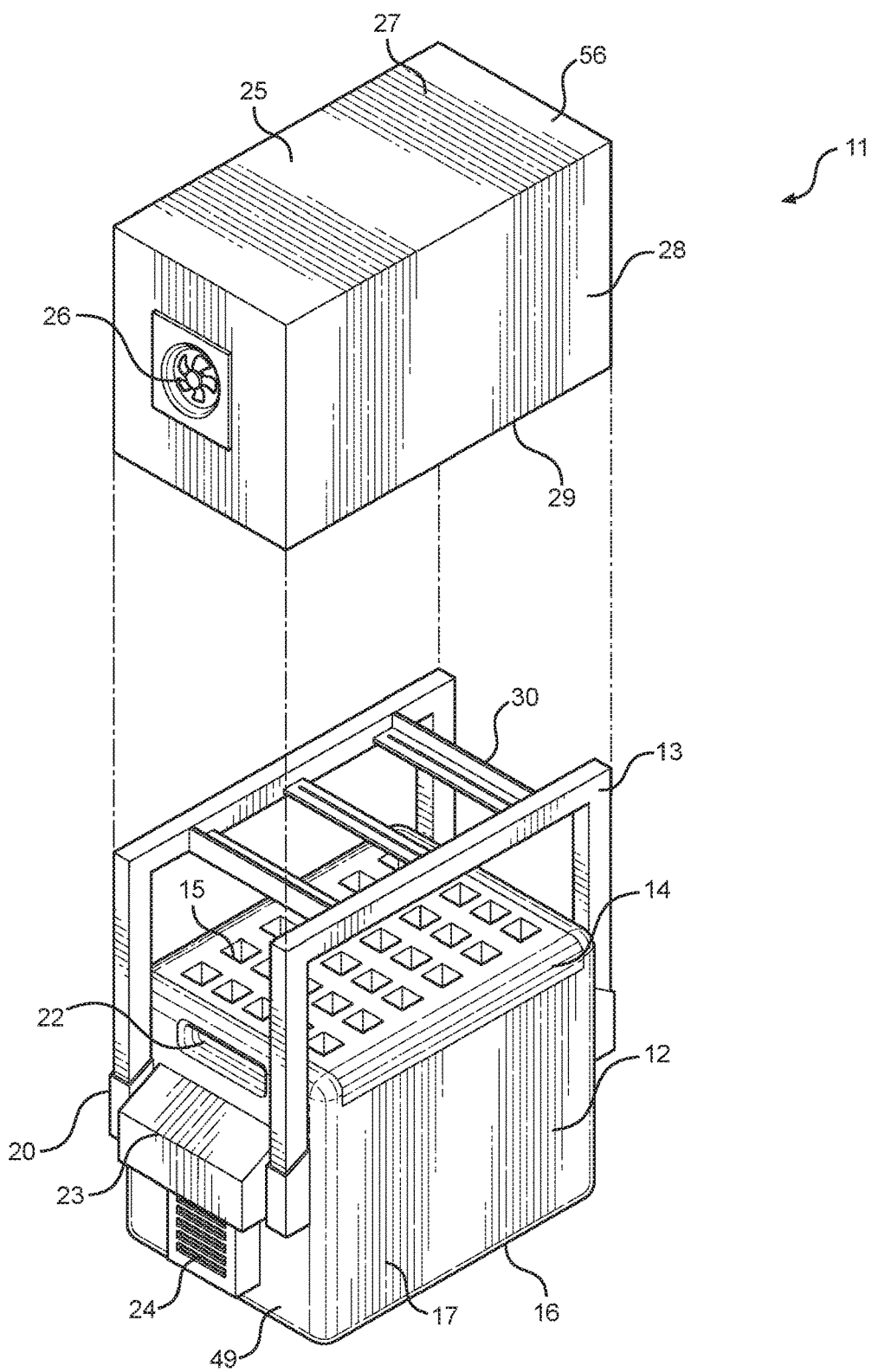
FIG. 2 shows a perspective view of an embodiment of the self-contained plant cloning system.

Referring now to FIGS. 1 and 2, there is shown an exploded view of the reservoir, the rack, and the bracket of the self-contained plant cloning system and a perspective view of an embodiment of the self-contained plant cloning system, respectively. The system 11 comprises a reservoir 12 having a base 16, one or more sidewalls 17, and an open upper end 18, defining an interior volume. In the illustrated embodiment, the reservoir 12 comprises a rectangular cross section, however, in alternate embodiments, the reservoir 12 comprises any suitable shaped cross section, such as a circle or square.

The interior volume of the reservoir 12 is configured to receive liquid therein. Preferably, the reservoir 12 is waterproof so as to prevent water leaking therefrom. In the illustrated embodiment, the reservoir 12 is composed of any suitable material configured to maintain the internal temperature thereof. In this way, the temperature of the liquid disposed within the reservoir 12 does not fluctuate with external temperatures in which the self-contained plant cloning system 11 is positioned.

The opposing sidewalls 17 of the reservoir 12 each include a handle 22 so as to allow a use o grasp and move the self-contained plant cloning system 11 when desired. In the illustrated embodiment, the handles 22 are disposed on the upper end of the sidewalls 17 and comprise rectangular shaped apertures configured to receive a user's hand therein. In other embodiments, the handles 22 are positioned on one or more sidewalls of the exterior of the reservoir 12 and comprise a shape suitable to be grasped by a user, such as a U-shaped bar extending perpendicularly outward from the sidewall 17.

The system 11 further comprises a rack 14 removably covering the open upper end 18 of the reservoir 12. The rack 14 comprises a cross section having the same shape as that of the upper end 18 of the reservoir 12 so as to create a seal and prevent any openings between the edges of the upper end 18 of the reservoir 12 and the edges of the rack 14. The seal therebetween helps maintain a controlled environment within the system 11.

In the illustrated embodiment, an elongated lip 19 is disposed on a first and second sidewall 49, 50 of the reservoir 12 so as to prevent the rack 14 from moving once placed on the upper end 18 of the reservoir 12. The lip 19 extends the latitudinal length of the sidewall 49, 50 on which it is attached and extends upward therefrom. The upper end of each lip 19 is flush with the upper end of the rack 14 when the rack 14 is disposed on the reservoir 12 in order to create a flat, continuous surface.

The rack 14 comprises one or more openings 15 extending from the upper surface through to the lower surface thereof. Each opening 15 is configured to receive a stem of a plant to be cloned. In the illustrated embodiment, the rack 14 comprises a plurality of aligned rows and a plurality of aligned columns of openings 15, such that the openings 15 are disposed at a fixed interval from one another. However, in alternate embodiments, the rows and columns are configured such that the openings 15 are staggered. In the illustrated embodiment, each opening 15 comprises a square cross section, however, in alternate embodiments, the openings 15 comprise any suitable shape configured to receive the stem of a plant. In some embodiments, a closed-cell foam is positioned within each opening. The foam comprises a slot configured to receive the stem therethrough. The foam allows the stem to maintain a secure position within each opening 15.

In the illustrated embodiment, the self-contained plant cloning system 11 comprises a bracket 13 adapted to support one or more light sources above the rack 14. The bracket 13 comprises a first U-shaped member 51 connected to a second U-shaped member 52 by one or more cross-members 30 extending perpendicularly therebetween. A first end of the cross-member 30 is secured to a horizontal portion 47 of the first U-shaped member 51 and a second end of the cross-member 30 is secured to a horizontal portion 47 of the second U-shaped member 52. The cross-member 30 provides a platform on which a light source is adapted to rest. The cross-members 30 extend the length between the opposing lateral sidewalls 17 of the reservoir 12. In this way, one or more light sources can be supported over a greater area of the rack 14 and, therefore, illuminate a greater area of the plant stems positioned therebelow. In some embodiments, a cross-member 30 comprises a ledge 53 configured to serve as a barrier for preventing a light source from falling off the cross-member 30.

Each U-shaped member 51, 52 further comprises a pair of vertical portions 48 extending perpendicularly downward from the ends of the horizontal portion 47 thereof. The distal end of each vertical portion 48 is removably disposed within a support 20 that extends outward from the exterior of the reservoir 12. The support 20 comprises a slot configured to receive the vertical portion 48 therein. In this way, the bracket 13 is removably secured to the reservoir 12. A first pair supports 20 are disposed on opposing sides of the first sidewall 49 and a second pair of supports 20 are disposed on opposing sides of the second sidewalk 50, wherein each support 20 is configured to align with and receive a respective vertical portion 48 of the bracket 13.

The bracket 13 is further configured to support a humidity cover 28, shown in FIG. 2, thereon. The humidity cover 25 is configured to maintain a desired humidity range within the system 11. The humidity cover 25 comprises closed upper end 27, an open lower end 29, and one or more sidewalk 28 extending therebetween. The lower end 29 is configured to receive the bracket 13 therein. A sidewall 28 of the humidity cover 25 comprises an opening, wherein an exhaust fan 26 is secured within the opening. The exhaust fan 26 is configured to remove moisture collected within the humidity cover 25 to the exterior of the system 11. The exhaust fan 26 is operably connected to a control unit 23 that allows a user to selectively operate the exhaust fan 26 by turning the fan 26 on and off. The humidity cover 25 comprises a layer 56 composed of a reflective material, such as aluminum metal. The layer reflects outside light from penetrating the interior of the self-contained plant cloning system 11. This helps maintain the temperature of the interior of the system 11 and prevents excess heat build-up from outside sources. In some embodiments, the humidity cover 25 comprises an insulating layer in order to help maintain the temperature and environment within the reservoir 12.

Figure 3:
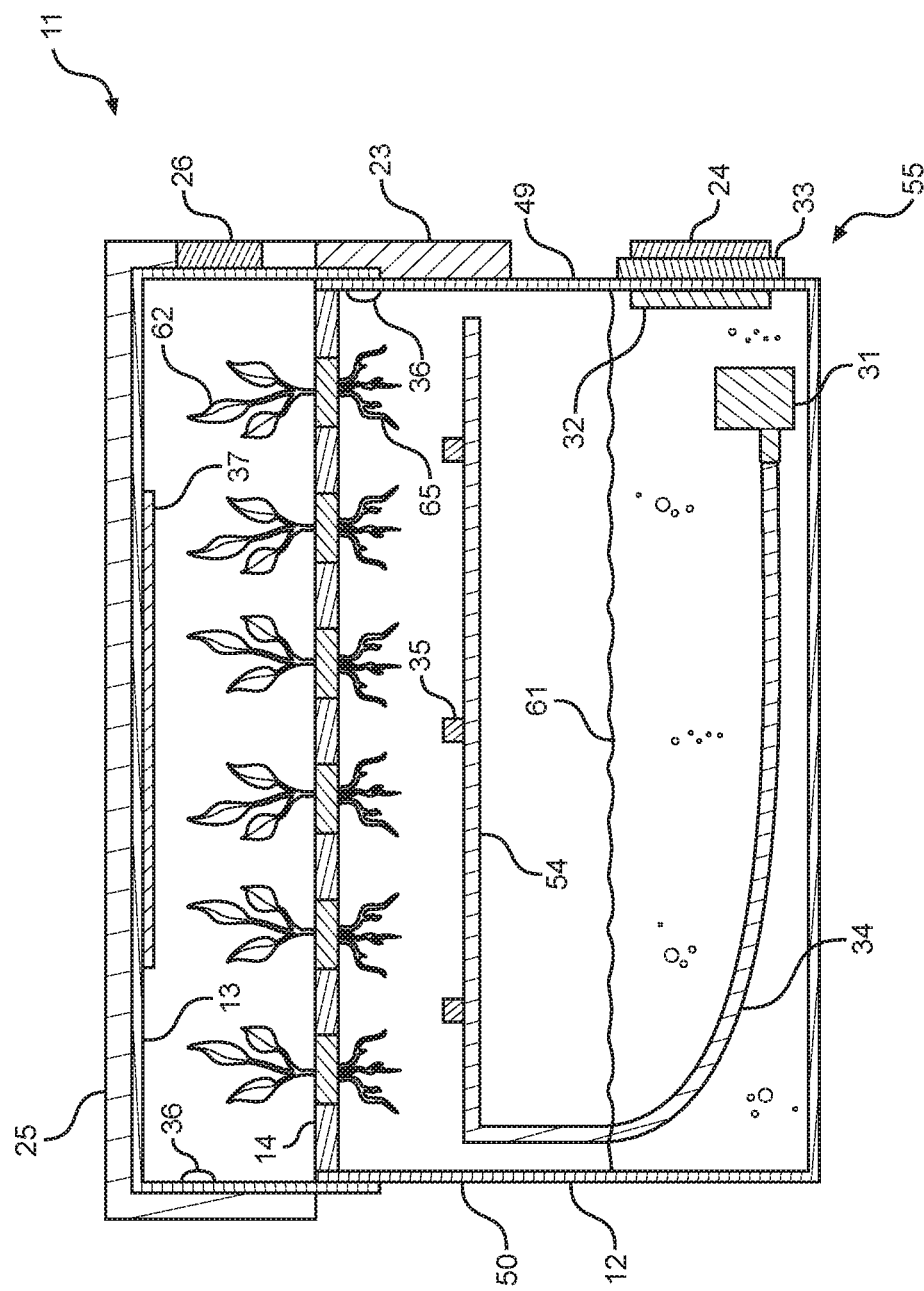
FIG. 3 shows a cross sectional view of an embodiment of the self-contained plant cloning system.

Referring now to FIG. 3, there is shown a cross sectional view of an embodiment of the self-contained plant cloning system. The interior volume of the reservoir 12 comprises a submersible pump 31 disposed on the base 16 thereof. The submersible pump 31 is in fluid communication, via pipes 34, with one or more sprayers 35 disposed within the reservoir 12. The pump 31 is configured to pump liquid 61 contained within the reservoir 12 through one or more pipes 34, wherein the sprayers 35 disperse the liquid onto the plant stem 62 or root 63 thereof. In the illustrated embodiment, the pipe 34 extending horizontally along a sidewall is in fluid communication with the pump 31. One or more sprayers 35 extend outward from an upper section 54 of the pipe 34. The sprayers 35 are separated at fixed intervals from one another. In operation, the pump 31 moves liquid through the pipes 34 and out through the sprayers 35. In alternate embodiments, the sprayers 35 and pipes 34 comprise a variety of configurations adapted to allow the pump 31 to pass liquid from the reservoir 12 through the sprayers 35 and onto the openings of the rack 14 where the plant stem 62 and roots 63 are located. The liquid 61 disposed within the reservoir 12 comprises a mixture of water and nutrients adapted to be sprayed on stems positioned within the reservoir 12. As the pump is operated, it is configured to circulate the liquid 61 within the reservoir 12. The pump 31 is configured to pump liquid 61 through the sprayers 35 at pre-determined timed intervals. The time in which the pump 31 is off allows the roots 65 to have a pre-determined drying time which encourages root growth. However, in order promote efficient root 65 growth, the environment needs to counter-act the heat generated by the pump 31.

The self-contained plant cloning system 11 comprises a cooling element configured to directly contact the liquid 61 disposed within the reservoir 12. The cooling element is adapted to cool the liquid 61 as the pump 31 is operated in order to prevent heat build-up caused by operating the submersible pump 31. In the illustrated embodiment, the cooling element is a thermoelectric cooler 55. The thermoelectric cooler 55 comprises a cold side 32 disposed on the interior of the reservoir 12, wherein the cold side 32 is adapted to be submerged beneath the liquid 61. The cold side 32 comprises a rectangular shaped cross section. In some embodiments, the cold side 32 comprises a plurality of fins spaced parallel to one another at fixed intervals and extending the length of the cold side 32 so as to create more surface area for liquid 61 to pass over. In this way, more liquid 61 can be cooled in a shorter amount of time.

The thermoelectric cooler 55 comprises a hot side 33 opposite the cold side 32 and operably connected thereto, wherein the hot side 33 is disposed on the exterior of the reservoir 12. A heat sink composed of a thermal conductive metal is disposed over the hot side 33 so as to dissipate the heat generated to cool the cold side 32. The heat sink is planar and is configured to cover the surface of the hot side 33. In the illustrated embodiment, an external fan and vent 24 are positioned on over the heat sink so as to further dissipate the heat generated by the thermoelectric cooler 55.

In the illustrated embodiment, the pump 31 is positioned adjacent to the thermoelectric cooler 55. The positioning of the pump 31 elative to the thermoelectric cooler 55 allows the circulated liquid 61 to cool more efficiently. As the pump 31 forces liquid 61 through the sprayers 35, the pump 31 generates heat. However, as the circulated liquid 61 passes over the cold side 32 of the thermoelectric cooler 55 the liquid 61 is cooled. This prevents a build-up of heat generated by the pump 31.

The bracket 13 supports one or more light sources 37 positioned above the rack 14. The light source 37 comprises an elongated bulb in order to extend between the first and second sidewalls 49, 50 of the reservoir 12. In the illustrated embodiment, the light source 37 emits a red color in order to stimulate root growth. However, in alternate embodiments, the system 11 comprises other color light sources, such as blue, in a variety of bulb types, such as incandescents, fluorescent lights, high-intensity discharge lamps, and light-emitting diodes.

One or more video cameras 36 are disposed within the reservoir 12. The video cameras 36 allow a user to monitor the environment and growth of the plant stem 62 and roots 63 without having to disassemble the system 11 and disrupt the self-contained environment. The plant stems 62 thus extend upwards from the opening of the rack 14, while the roots 63 of the plants are housed within the interior volume of the reservoir 12. In the illustrated embodiment, a first camera 36 is secured to the upper end of the first sidewall 49 so as to monitor the root 63 growth and interior of the reservoir 12. The humidity cover 25 comprises a second camera 36 secured to an interior sidewalls thereof so as to monitor the growth of the plant stem 62 disposed above the rack 14.

Figure 4:
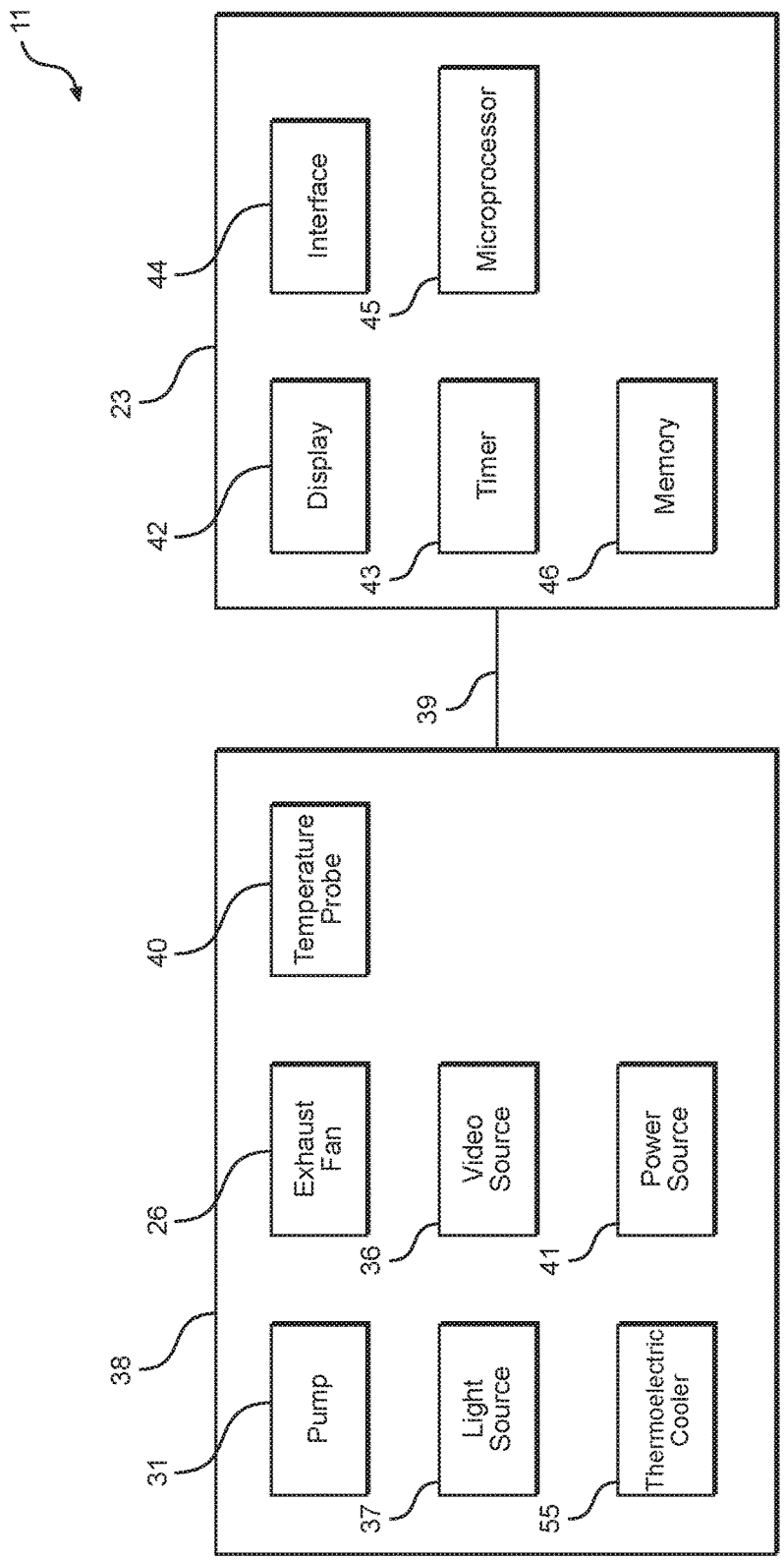
FIG. 4 shows a diagram of an embodiment of the self-contained plant cloning system.

Referring now to FIG. 4, there is shown a diagram of an embodiment of the self-contained plant cloning system. The self-contained plant cloning system 11 comprises a control unit 23 disposed on the exterior of the reservoir 12. The control unit 23 is operably connected to the exhaust fan 25, the submersible pump 31, the thermoelectric cooler 55, the first and second video cameras 36, a temperature probe 40, and a power source 41. However, in alternate embodiments, the control unit 23 is remote. In the illustrated embodiment, the control unit 23 comprises a display 42, a microprocessor 45, a timer 45, a memory 46, and a user interface 44.

The user interface 44 comprises a plurality of controls that allows a user to selectively turn on and off the exhaust fan 26, submersible pump 31 and thermoelectric cooler 55. In some embodiments the interface 44 comprises a touchscreen and in other embodiments the interface 44 comprises a keypad or keyboard. The microprocessor 45 is configured to communicate a user's input data with the various operating components of the system 11. The memory 46 is configured to store programmed lengths of time in which the pump 31 should be operated. The memory 46 is further configured to store video feed from the video cameras, including the first and second video camera 36.

The timer 43 is further operably connected to the pump 31. In operation, a user can set the length of time or a period of intermittent times via the timer 43 in which the pump 31 will operate. Pump operation is defined as forcing water through the sprayers and circulating the liquid disposed in the reservoir.

A power source 41 is disposed within the system 11 so as to power the control unit 23, pump 31, thermoelectric cooler 55, video cameras 36 and light sources 37. The temperature probe 40 or temperature sensor is disposed in the reservoir and adapted to be submerged in the liquid. The temperature probe 40 measures the temperature and displays the measurement on the display 42. Further, the display 42 allows a user to view the video from the first or second camera 36. In the illustrated embodiment, the pump 31 and hermoelectric cooler 55 are configured to operate simultaneously. However in other embodiments, the reservoir further comprises an agitator configured to circulate the liquid so as to allow the liquid to cool through the cool side of the thermoelectric cooler 55 when the pump is not operated. It is an objective of the system 11 to maintain an environment having a stable temperature, wherein the temperature can be controlled to a degree. In being able to do so, the reservoir is configured to maintain the internal temperature thereof, unless otherwise selectively adjusted via the control unit 23.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-contained plant cloning system, comprising:
 a reservoir comprising a base, one or more sidewalls, and an open upper end, wherein the reservoir is configured to hold liquid;
 a rack disposed over the open upper end of the reservoir, the rack configured to support plants therein;
 a pump disposed in the reservoir;
 a cooling element configured to be submerged in liquid disposed within the reservoir, wherein the cooling element is configured to cool the liquid within the reservoir;
 one or more sprayers operably connected to the pump.

2. The self-contained plant cloning system of claim 1, further comprising:
   a control unit operably connected to the pump and the cooling element, the control unit configured to selectively operate the pump and the cooling element.

3. The self-contained plant cloning system of claim 2, further comprising:
   a temperature probe;
   a video camera;
   a light source;
   a timer;
   wherein the temperature probe, the video camera, the light source, and the timer are operably connected to the control unit.

4. The self-contained plant cloning system of claim 2, further comprising:
   a humidity cover removably covering the open upper end of the reservoir, wherein the humidity cover comprises an open lower end, one or more sidewalk, and a closed upper end;
   an exhaust fan integrated in the one or more sidewalls, the exhaust fan operably connected to the control unit.

5. The self-contained plant cloning system of claim 4, further comprising a bracket including a pair of U-shaped members connected by one or more cross-members extending perpendicularly therebetween, wherein distal end of each U-shaped member are removably secured to the reservoir and the bracket removably receives the humidity cover thereon.

6. The self-contained plant cloning system of claim 1, wherein the cooling element is a thermoelectric cooler.

7. The self-contained plant cloning system of claim 1, wherein the cooling element and the pump are positioned on a same side of the reservoir, adjacent to one another.

8. The self-contained plant cloning system of claim 1, wherein the rack comprises one or more openings extending from an upper surface of the rack through to a lower surface thereof.

9. A method of cloning a plant, comprising the steps of:
   activating a pump disposed within a reservoir;
   circulating a liquid in the reservoir with the pump;
   cooling the liquid with a cooling element, wherein the cooling element is submerge in the circulating liquid;
   pumping the liquid via a sprayer on a rack disposed adjacent to the sprayer, wherein the rack is configured to receive a plant therein and the sprayer being operably connected to the pump.

10. The method of claim 9, further comprising the steps of:
    monitoring growth of a root of the plant with a first video camera disposed in the reservoir;
    monitoring growth of a leaf of the plant with a second video camera disposed in a humidity cover removably covering an upper end of the reservoir.

11. The method of claim 9, further comprising the steps of:
    measuring a temperature of the liquid with a temperature probe disposed in the liquid;
    adjusting the tempera re of the liquid by operating the cooling element.

12. The method of claim 9, further comprising the steps of:
    measuring a humidity within a humidity cover disposed over an open upper end of the reservoir and increasing or decreasing the humidity by operating an exhaust fan disposed in the humidity cover, wherein the humidity cover removably covers an open upper end of the reservoir.

13. The method of claim 9, further comprising the steps of:
    operating the pump and the cooling element for a predetermined time in order to spray the plant with the liquid and to cool the liquid simultaneously.

* * * * *